United States Patent
Kawasaki et al.

(10) Patent No.: US 9,727,796 B2
(45) Date of Patent: Aug. 8, 2017

(54) PARKING ASSISTANCE SYSTEM AND PARKING ASSISTANCE METHOD

(71) Applicant: PANASONIC CORPORATION, Osaka (JP)

(72) Inventors: Akihisa Kawasaki, Kanagawa (JP); Koji Fujii, Kanagawa (JP); Tatsuto Ryugo, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/652,300

(22) PCT Filed: Mar. 27, 2014

(86) PCT No.: PCT/JP2014/001772
§ 371 (c)(1),
(2) Date: Jun. 15, 2015

(87) PCT Pub. No.: WO2014/156166
PCT Pub. Date: Oct. 2, 2014

(65) Prior Publication Data
US 2015/0356359 A1    Dec. 10, 2015

(30) Foreign Application Priority Data
Mar. 29, 2013  (JP) .................. 2013-071847

(51) Int. Cl.
*G06K 9/00* (2006.01)
*G06K 9/46* (2006.01)
*G06K 9/62* (2006.01)
(Continued)

(52) U.S. Cl.
CPC ............ *G06K 9/00812* (2013.01); *B60R 1/00* (2013.01); *B62D 15/028* (2013.01); *G06K 9/46* (2013.01);
(Continued)

(58) Field of Classification Search
None
See application file for complete search history.

(56) References Cited

U.S. PATENT DOCUMENTS

| 8,504,233 B1 * | 8/2013 | Ferguson | G06K 9/00798 340/463 |
| 9,081,385 B1 * | 7/2015 | Ferguson | G06K 9/00798 |

(Continued)

FOREIGN PATENT DOCUMENTS

| DE | 102010023162 | 12/2011 |
| EP | 1674376 | 6/2006 |

(Continued)

OTHER PUBLICATIONS

The Extended European Search Report dated Feb. 19, 2016 for the related European Patent Application No. 14772674.9.
(Continued)

*Primary Examiner* — Shervin Nakhjavan
(74) *Attorney, Agent, or Firm* — Pearne & Gordon, LLP

(57) ABSTRACT

A parking assistance system includes: a color/IR detector which detects, from a camera image captured with a camera, marker candidates that are areas in each of which an intensity of a color component or an infrared (IR) component exceeds a threshold; a marker position calculator which calculates positions of the marker candidates in the camera image; and a validity verifier which determines whether the marker candidates are valid as the markers, based on the positions of the marker candidates and a predetermined positional relationship of the markers.

16 Claims, 6 Drawing Sheets

(51) Int. Cl.
  *B60R 1/00* (2006.01)
  *B62D 15/02* (2006.01)
  *H04N 7/18* (2006.01)
  *G06T 7/73* (2017.01)
(52) U.S. Cl.
  CPC .............. *G06K 9/6201* (2013.01); *G06T 7/73* (2017.01); *H04N 7/181* (2013.01); *B60R 2300/207* (2013.01); *B60R 2300/308* (2013.01); *B60R 2300/806* (2013.01); *B60T 2201/10* (2013.01); *G06K 2009/4666* (2013.01); *G06T 2207/10016* (2013.01); *G06T 2207/10024* (2013.01); *G06T 2207/10048* (2013.01); *G06T 2207/20081* (2013.01); *G06T 2207/30241* (2013.01); *G06T 2207/30264* (2013.01)

(56) References Cited

U.S. PATENT DOCUMENTS

| | | | |
|---|---|---|---|
| 2004/0016870 A1* | 1/2004 | Pawlicki | G06K 9/4604 250/208.1 |
| 2010/0231416 A1 | 9/2010 | Wu et al. | |
| 2010/0259609 A1* | 10/2010 | Takahashi | G06K 9/72 348/135 |
| 2012/0050074 A1* | 3/2012 | Bechtel | B60R 1/04 340/988 |
| 2013/0085637 A1 | 4/2013 | Grimm et al. | |
| 2013/0162829 A1 | 6/2013 | Kadowaki et al. | |

FOREIGN PATENT DOCUMENTS

| | | |
|---|---|---|
| EP | 2145799 | 1/2010 |
| JP | 58-114283 A | 7/1983 |
| JP | 2003-182489 A | 7/2003 |
| JP | 2011-70566 A | 4/2011 |
| JP | 2012-71794 A | 4/2012 |
| JP | 2012-206580 A | 10/2012 |

OTHER PUBLICATIONS

International Search Report for Application No. PCT/JP2014/001772 dated Jul. 1, 2014.

* cited by examiner

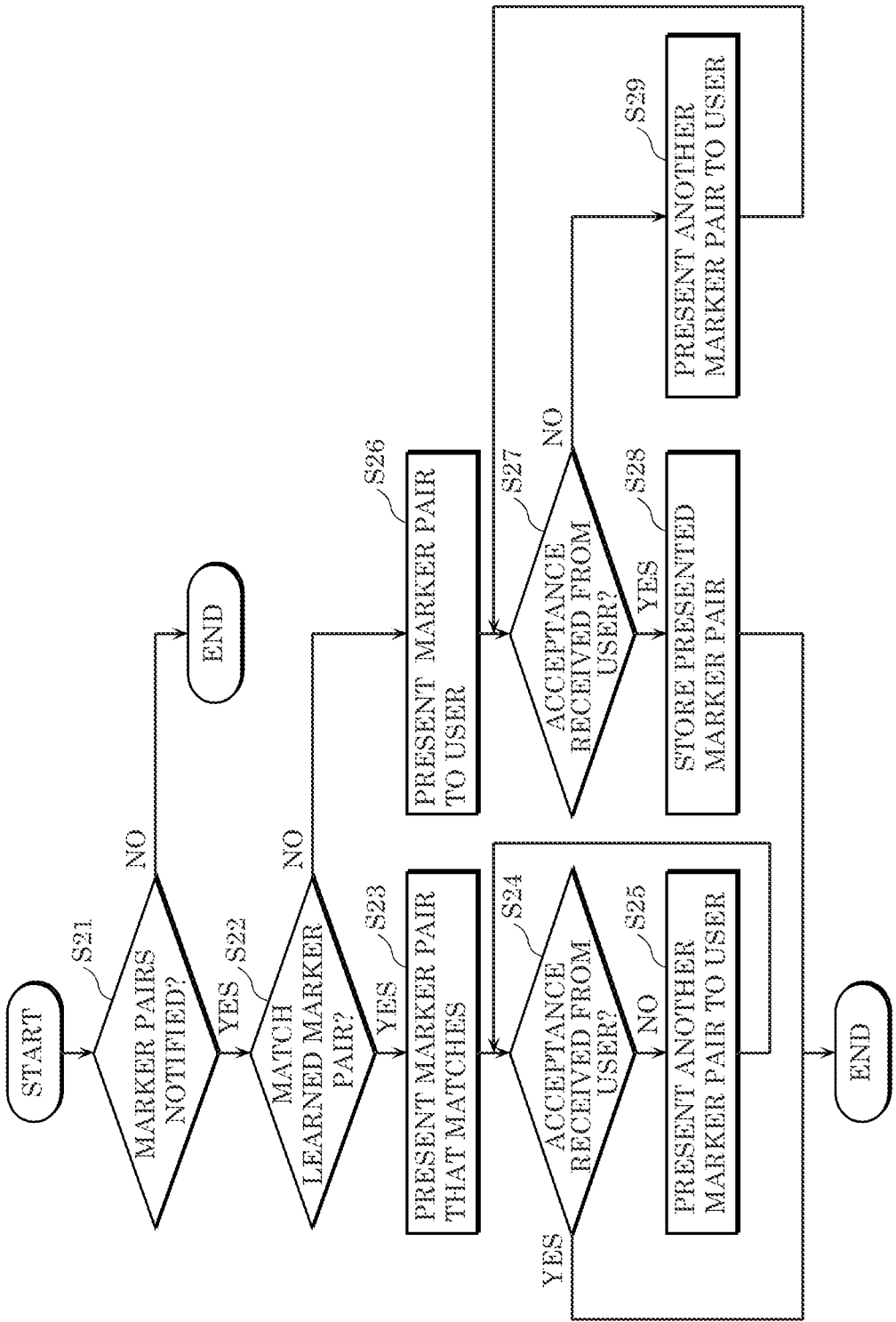

PARKING ASSISTANCE SYSTEM AND PARKING ASSISTANCE METHOD

TECHNICAL FIELD

The present invention relates to parking assistance systems and parking assistance methods for assisting parking a vehicle, based on image information displayed on a display device in the vehicle.

BACKGROUND ART

A parking assistance device is conventionally known which assists parking a vehicle when the vehicle is to be parked, based on image information displayed on a display device (for example, a car navigation system) provided in the vehicle. Image information is obtained by, for example, processing a camera image captured by an in-vehicle camera provided at, for instance, the rear of a vehicle. Examples of such image processing include image conversion processing for converting a camera image into an overhead image, and image recognition processing for recognizing a marker indicating a parking area in the overhead image (see Patent Literature 1, for example).

CITATION LIST

Patent Literature

PTL 1: Japanese Unexamined Patent Application Publication No. 2012-71794

SUMMARY OF THE INVENTION

Technical Problems

However, image recognition processing mentioned above includes processing that requires great load, such as, for example, edge detection and pattern matching, and thus a parking assistance device disclosed in PTL 1 has a problem that a high-performance processor for image processing is necessary, which costs a lot. In order to solve this problem, a conceivable method is to recognize a marker based on an infrared (IR) component in an infrared night-vision image or a specific color in a color image.

However, according to such a marker recognition method based on an IR component or a specific color, an object having the same IR component or the same color as a marker in a camera image may be incorrectly recognized as the marker.

An object of the present invention is to provide a parking assistance system and a parking assistance method for preventing incorrect recognition of a marker while keeping the cost of image processing low.

Solutions to Problems

A parking assistance system according to an aspect of the present invention is a parking assistance system for capturing an image that includes markers indicating a parking area, calculating a path based on positions of the markers and a current position of a vehicle, and indicating a steering angle for the vehicle to move along the path, to assist parking the vehicle in the parking area, includes: a marker candidate detector which detects, from a camera image captured with a camera, marker candidates that are areas in each of which an intensity of a color component or an infrared (IR) component exceeds a threshold; a marker position calculator which calculates positions of the marker candidates in the camera image; and a validity verifier which determines whether the marker candidates are valid as the markers, based on the positions of the marker candidates and a predetermined positional relationship of the markers.

A parking assistance method according to an aspect of the present invention is a parking assistance method for capturing an image that includes markers indicating a parking area, calculating a path based on positions of the markers and a current position of a vehicle, and indicating a steering angle for the vehicle to move along the path, to assist parking the vehicle in the parking area, includes: detecting, from a camera image captured with a camera, marker candidates that are areas in each of which an intensity of a color component or an infrared (IR) component exceeds a threshold; calculating positions of the marker candidates in the camera image; and determining whether the marker candidates are valid as the markers, based on the positions of the marker candidates and a predetermined positional relationship of the markers.

Advantageous Effects of Invention

The present invention can prevent incorrect recognition of a marker while keeping the cost of image processing low.

BRIEF DESCRIPTION OF DRAWINGS

FIG. 6 is a flow chart showing an example of operation of a marker pair presenter of the parking assistance system according to the second exemplary embodiment of the present invention.

DESCRIPTION OF EMBODIMENTS

First Exemplary Embodiment

Figure 1:
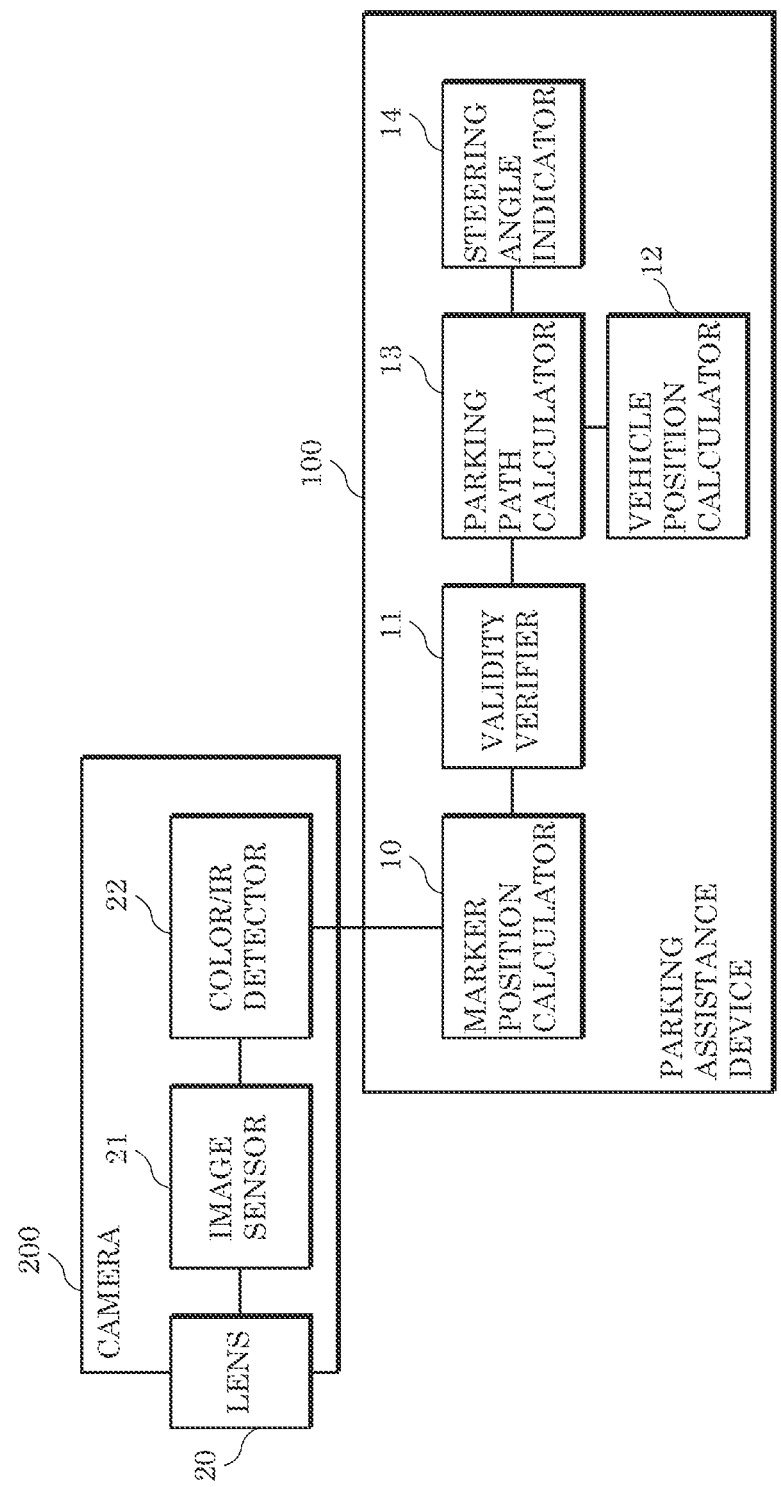
FIG. 1 is a block diagram illustrating an example of a configuration of a parking assistance system according to a first exemplary embodiment of the present invention.

A description is given of a first exemplary embodiment of the present invention with reference to the drawings.
<Configuration of Parking Assistance System>
The first is a description of a configuration of a parking assistance system according to an exemplary embodiment of the present invention. FIG. 1 is a block diagram illustrating an example of a configuration of a parking assistance system according to the present exemplary embodiment.

A parking assistance system is provided in a vehicle and assists parking the vehicle. In FIG. 1, the parking assistance system includes camera 200 and parking assistance device 100.

<Configuration of Camera 200>

Camera 200 includes lens 20, image sensor 21, and color/IR detector 22.

Lens 20 captures incident light.

Image sensor 21 has photonic color filters corresponding to colors (Red, Green, Blue) and IR. Image sensor 21 allows the incident light captured by lens 20 to pass through the above filters, and extracts a color or IR component. Then, image sensor 21 outputs an image signal including the extracted color or IR component to color/IR detector 22.

Color/IR detector 22 processes the image signal from image sensor 21, to generate a color image or an infrared night-vision image (hereinafter, referred to as a "camera image"). A camera image is a real time image captured by camera 200. As a camera image, a color image is generated in the daytime, whereas an infrared night-vision image is generated in the nighttime.

In addition, color/IR detector 22 determines whether an intensity (brightness) of a specific color component or an IR component exceeds a predetermined threshold in a camera image. A threshold herein is a predetermined value based on an average brightness of the camera image, for example.

Next, color/IR detector 22 detects, from the camera image, a marker candidate that is an area in which an intensity exceeds the threshold. Here, plural marker candidates are detected. A marker candidate is an area considered to be the image of a marker in a camera image. In this way, color/IR detector 22 also functions as a marker candidate detector.

Here, a description is given of a marker. A marker is a mark for locating a parking area of a vehicle, and is disposed on the ground. In the present exemplary embodiment, two markers are used. The two markers are disposed with a predetermined distance therebetween. The markers have a predetermined color. Each marker includes a highly reflective reflector and a near-infrared film. Accordingly, the markers can be detected in both the daytime and nighttime.

Color/IR detector 22 outputs a camera image showing plural marker candidates to marker position calculator 10 of parking assistance device 100. It should be noted that this camera image is displayed, for example, on a display device (not illustrated) of a car navigation system or the like.

<Configuration of Parking Assistance Device 100>

Parking assistance device 100 includes marker position calculator 10, validity verifier 11, vehicle position calculator 12, parking path calculator 13, and steering angle indicator 14.

Marker position calculator 10 calculates positions (coordinates) of marker candidates in a camera image from color/IR detector 22, and notifies validity verifier 11 of the calculated positions.

Validity verifier 11 verifies (determines) whether the notified marker candidates are valid as markers, based on the positions of the marker candidates notified from marker position calculator 10 and a predetermined positional relationship of the two markers (for example, a distance between the markers). The following describes an example of this verification.

Validity verifier 11 selects one of the plural marker candidates as a first marker candidate. Next, validity verifier 11 calculates, based on the predetermined positional relationship of the two markers, an area in which a second marker candidate paired with the first marker candidate is likely to be present (hereinafter, referred to as a "marker candidate present area"). Next, validity verifier 11 determines whether a marker candidate other than the first marker candidate is present in the marker candidate present area. If a result of the determination shows that another marker candidate is present in the marker candidate present area, validity verifier 11 determines the marker candidate to be the second marker candidate, and to be paired with the first marker candidate. Then, validity verifier 11 recognizes the first marker candidate and the second marker candidate as valid two predetermined markers. Next, validity verifier 11 notifies parking path calculator 13 of the positions of the two markers (coordinates of the first marker candidate and coordinates of the second marker candidate).

It should be noted that the marker candidate present area mentioned above is calculated as follows. The coordinates of the first marker candidate in a camera image are (x, y). The coordinates (x, y) have the following mathematical relations with focal length f of a camera and coordinates (X, Y, Z) in a three-dimensional space (real space) relative to a road surface.

$$x = f \cdot X/Z$$

$$y = f \cdot Y/Z$$

Here, the second marker candidate paired with the first marker candidate is at a certain distance from the first marker candidate. Accordingly, with regard to the three-dimensional coordinates (X, Y, Z), if the x and y axes are placed on a plane with the first marker candidate serving as an origin, the coordinates of the second marker candidate (X', Y', 0) are $X'^2 + Y'^2 = A$. Consequently, if the coordinates of the second marker candidate in a camera image are (x', y'), the second marker candidate will be present on an elliptic curve which can be expressed by $x'^2/a^2 + y'^2 = 1$.

Vehicle position calculator 12 calculates the amount of movement of the vehicle from the initial position, based on a vehicle speed pulse and a steering angle, and calculates the position of the vehicle (a current position of the vehicle) based on the amount of movement. Alternatively, vehicle position calculator 12 may obtain the position of the vehicle from the global positioning system (GPS), for instance. Then, vehicle position calculator 12 notifies parking path calculator 13 of the position of the vehicle.

Parking path calculator 13 calculates a path (hereinafter, a "parking path") along which the vehicle is to move, based on the positions of the two markers notified from validity verifier 11 and the position of the vehicle notified from vehicle position calculator 12. For example, if the two markers show the width of a parking area (the width of a vehicle), a parking path is calculated so that the vehicle is to move perpendicularly to a line connecting the centers of the two markers. Then, parking path calculator 13 notifies steering angle indicator 14 of the parking path.

Steering angle indicator 14 indicates to a driver how the steering wheel is to be operated (in other words, a steering angle), as the vehicle moves along the parking path notified from parking path calculator 13.

<Operation of Parking Assistance System>

Figure 2:
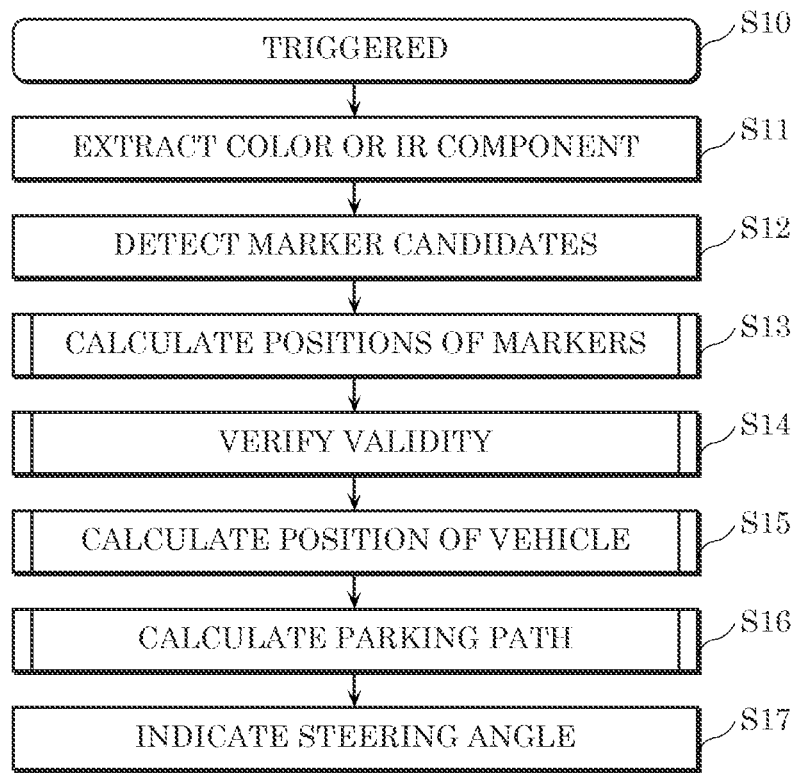
FIG. 2 is a flow chart showing an example of operation of the parking assistance system according to the first exemplary embodiment of the present invention.

The following describes operation of the parking assistance system according to an exemplary embodiment of the present invention. FIG. 2 is a flow chart showing an example of operation of the parking assistance system according to the present exemplary embodiment.

Figure 3:
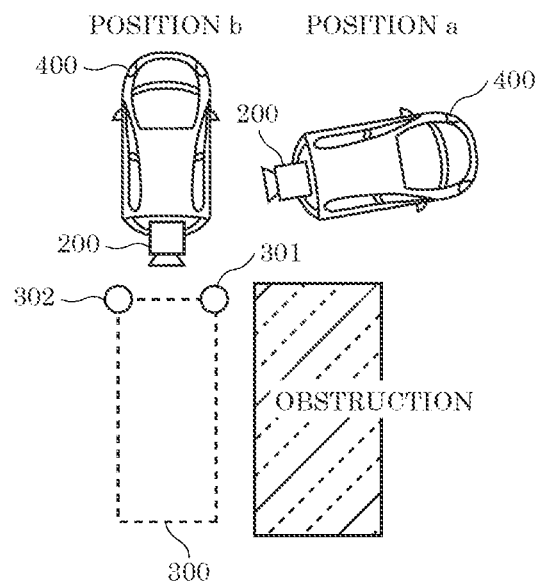
FIG. 3 illustrates an example of parking a vehicle, according to the first exemplary embodiment of the present invention.

In step S10, when, for example, the vehicle is shifted into reverse gear, the parking assistance system is triggered and camera 200 starts capturing an image. For example, as illustrated in FIG. 3, when vehicle 400 stops at position a and is shifted into reverse gear to be parked in parking area 300, the parking assistance system is triggered. In FIG. 3, vehicle 400 includes camera 200 at the rear of the vehicle. In addition, two markers 301 and 302 are disposed at the front right and left of parking area 300 in FIG. 3. It should be noted that although the present exemplary embodiment describes the case where two markers are disposed, three or more markers may be used.

In step S11, image sensor 21 extracts a color or IR component from light which has passed through lens 20. As described above, a color component (R, G, B) is extracted in the daytime, whereas an IR component is extracted in the nighttime.

Figure 4A:
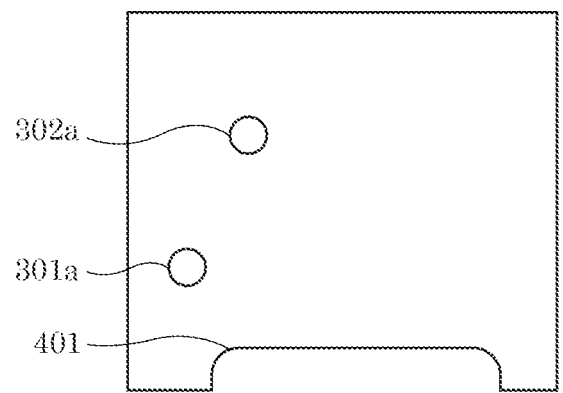
FIG. 4A illustrates an example of a camera image according to the first exemplary embodiment of the present invention.

In step S12, color/IR detector 22 generates either a color image or an infrared night-vision image, and furthermore detects marker candidates from that camera image. Specifically, in the camera image, an area in which a specific color component or an IR component exceeds a threshold is detected as a marker candidate. A specific color is a predetermined color and is a color of the marker. Here, FIG. 4A illustrates an example of a camera image generated when vehicle 400 is at position a in FIG. 3. The camera image illustrated in FIG. 4A includes marker candidates 301a and 302a, other than bumper 401 of vehicle 400.

In step S13, marker position calculator 10 calculates positions of the marker candidates in the camera image. For example, when a camera image is as illustrated in FIG. 4A, marker position calculator 10 calculates positions of marker candidates 301a and 302a in the camera image.

In step S14, validity verifier 11 verifies whether the marker candidates are valid as markers, based on the calculated positions of the marker candidates and the predetermined positional relationship of the two markers. The positional relationship of the two markers is a relationship in which markers 301 and 302 are separated at a certain distance, for example. For example, in the case of FIG. 4A, validity verifier 11 selects marker candidate 301a (first marker candidate), and calculates a marker candidate present area, based on the position of marker candidate 301a and the predetermined positional relationship of the two markers. Next, validity verifier 11 determines whether another marker candidate (second marker candidate) is present in the marker candidate present area. Here, if marker candidate 302a is present in the marker candidate present area, validity verifier 11 determines marker candidates 301a and 302a to be paired, and recognizes the pair as the predetermined two markers. It should be noted that here, although validity verifier 11 has selected marker candidate 301a as a first marker candidate, validity verifier 11 may select marker candidate 302a.

In step S15, vehicle position calculator 12 calculates the position of the vehicle. For example, in the case of FIG. 3, the position of the vehicle is at coordinates of position a.

In step S16, parking path calculator 13 calculates a parking path based on the position of the vehicle and the positions of the two markers. This parking path is calculated so that the vehicle moves perpendicularly to a line connecting the centers of markers 301 and 302, for example. Specifically, a parking path is a path along which vehicle 400 moves from position a to parking area 300 in FIG. 3, for example.

Figure 4B:
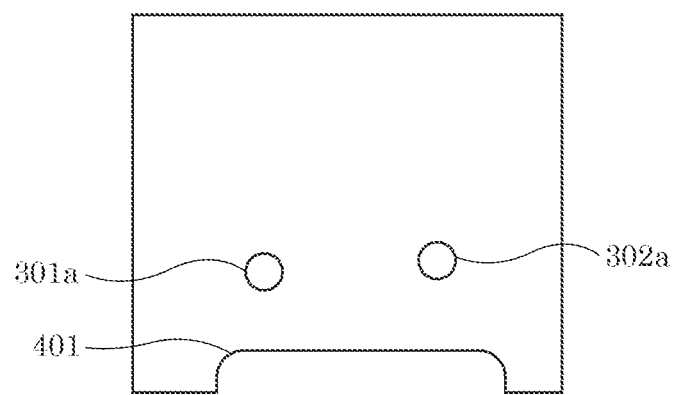
FIG. 4B illustrates an example of a camera image according to the first exemplary embodiment of the present invention.

In step S17, a steering angle for the vehicle to move along the parking path is indicated to a driver. If the driver operates the steering wheel in accordance with this indication, the driver can move vehicle 400 from position a to position b as illustrated in FIG. 3, for example. FIG. 4B illustrates an example of a camera image when vehicle 400 is at position b. After that, the driver can park vehicle 400 in parking area 300 by moving, in reverse, vehicle 400 at position b straight.

As described above, the parking assistance system according to the present exemplary embodiment has a feature of detecting a marker candidate from a camera image based on a color or IR component, and verifying whether the marker candidate is valid as a marker, based on a predetermined positional relationship of markers. In other words, the parking assistance system according to the present exemplary embodiment detects a marker candidate based on a color or IR component, and thus does not need to perform image processing (image conversion processing and image recognition processing) performed by a conventional parking assistance device. In addition, the parking assistance system according to the present exemplary embodiment verifies the validity of a detected marker candidate as a marker, and thus even detection based on a color or IR component allows a marker to be recognized with sufficient accuracy. Accordingly, the parking assistance system according to the present exemplary embodiment prevents incorrect recognition of a marker while keeping the cost of image processing low.

Second Exemplary Embodiment

A description is given of a second exemplary embodiment according to the present invention with reference to the drawings. The present exemplary embodiment handles the case where there are plural combinations of marker candidates each determined to be valid as a marker by validity verifier 11. It should be noted that although the present exemplary embodiment describes, as an example, the case where two marker candidates form a combination (hereinafter, referred to as a "marker pair"), three or more marker candidates may form a combination.

<Configuration of Parking Assistance System>

Figure 5:
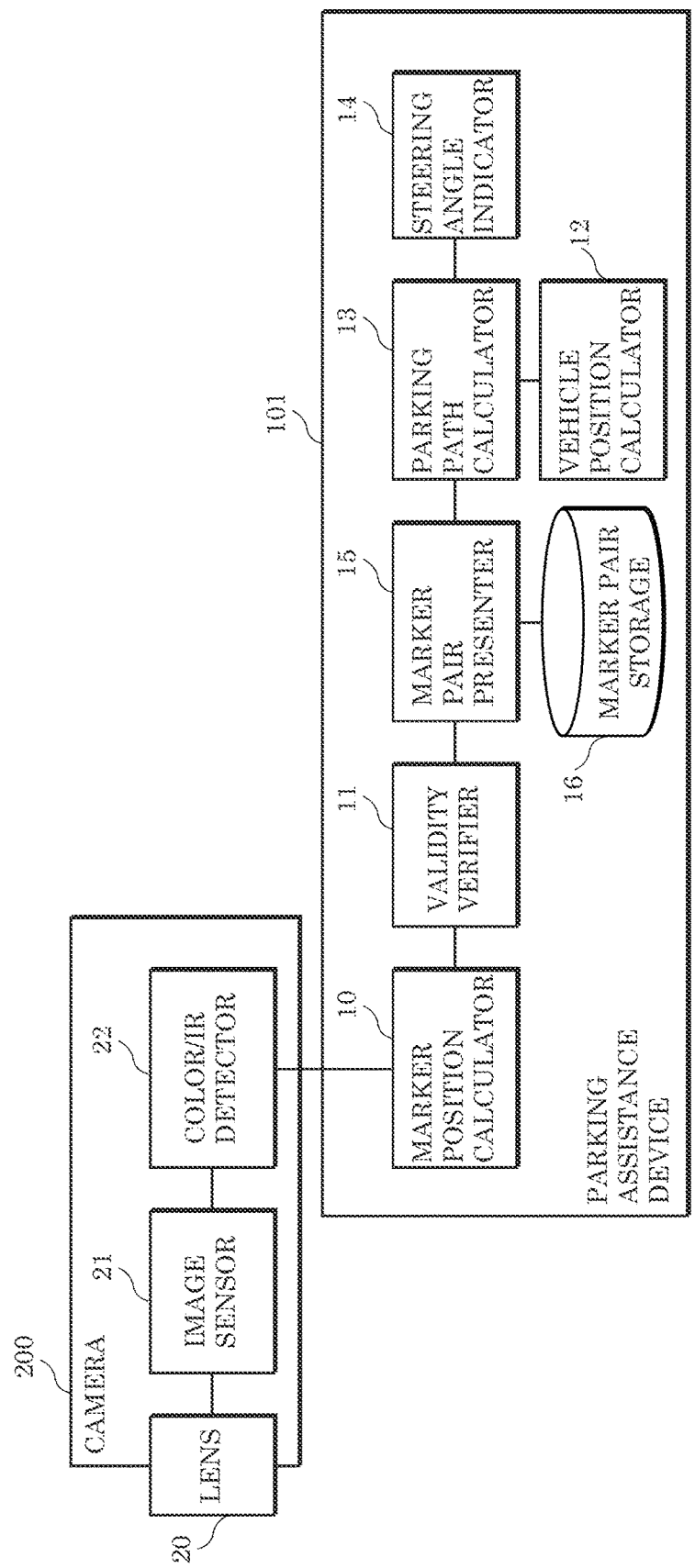
FIG. 5 is a block diagram illustrating an example of a configuration of a parking assistance system according to a second exemplary embodiment of the present invention.

The first is a description of the configuration of a parking assistance system according to the exemplary embodiment of the present invention. FIG. 5 is a block diagram illustrating an example of the configuration of the parking assistance system according to the present exemplary embodiment.

In FIG. 5, the parking assistance system includes camera 200 and parking assistance device 101. It should be noted that in FIG. 5, the same numerals are given to the same configuration as those in FIG. 1, and a description thereof is omitted here. Parking assistance device 101 according to the present exemplary embodiment differs from parking assistance device 100 according to the first exemplary embodiment in that marker pair presenter 15 (an example of a marker combination presenter) and marker pair storage 16 (an example of a marker combination storage) are provided.

Marker pair presenter 15 receives notification of plural marker pairs determined to be valid by validity verifier 11. Examples of the plural marker pairs include a pair of a first marker candidate and a second marker candidate (first marker pair) and a pair of a first marker candidate and a third marker candidate (second marker pair).

Marker pair presenter 15 compares the plural marker pairs notified from validity verifier 11 with a marker pair stored in marker pair storage 16 (hereinafter, referred to as "learned marker pair").

If the result of the above comparison shows that the notified plural marker pairs include a marker pair which matches a learned marker pair, marker pair presenter 15 presents to a user the marker pair on a display device. If acceptance is received from the user as a result of the presentation, marker pair presenter 15 adopts the presented marker pair, and notifies parking path calculator 13 of the positions of two markers which form the marker pair, whereas if acceptance is not received from the user as a result of the presentation, marker pair presenter 15 presents to the user another marker pair among the notified plural marker pairs.

On the other hand, if the result of the above comparison shows that the notified plural marker pairs includes no marker pair which matches any learned marker pair, marker pair presenter 15 selects a marker pair from among the notified plural marker pairs, and presents the marker pair to the user on the display device. If acceptance is received from the user as a result of the presentation, marker pair presenter 15 stores the presented marker pair into marker pair storage 16. In addition, marker pair presenter 15 adopts the presented marker pair, and notifies parking path calculator 13 of the positions of two markers which form the marker pair. On the other hand, if acceptance is not received from the user as a result of the presentation, marker pair presenter 15 presents to the user another marker pair among the notified plural marker pairs.

Marker pair storage 16 stores the marker pair for which acceptance has been received from the user, in other words, a learned marker pair. Information on the learned marker pair stored herein is, for example, information on the positions of a marker pair (latitude, longitude) and/or brightness information of the entire camera image.

<Operation of Marker Pair Presenter 15>

The following describes operation of marker pair presenter 15 according to an exemplary embodiment of the present invention. FIG. 6 is a flow chart showing an example of operation of marker pair presenter 15 according to the present exemplary embodiment. The operation shown in FIG. 6 is performed between verification of validity (step S14) and vehicle position calculation (step S15) described with reference to FIG. 2.

In step S21, marker pair presenter 15 determines whether plural marker pairs are notified from validity verifier 11. If the result of the determination shows that notification of plural marker pairs is not received (step S21: NO), the flow ends. In this case, marker pair presenter 15 notifies parking path calculator 13 of the positions of two markers which form a marker pair notified from validity verifier 11. On the other hand, if the result of the determination shows that notification of plural marker pairs is received (step S21: YES), the flow proceeds to step S22.

In step S22, marker pair presenter 15 compares the notified plural marker pairs with one or more learned marker pairs stored in marker pair storage 16. If the result of the comparison shows a marker pair that matches a learned marker pair (step S22: YES), the flow proceeds to step S23. On the other hand, if the result of the comparison shows no marker pair that matches any learned marker pair (step S22: NO), the flow proceeds to step S26.

Figure 7A:
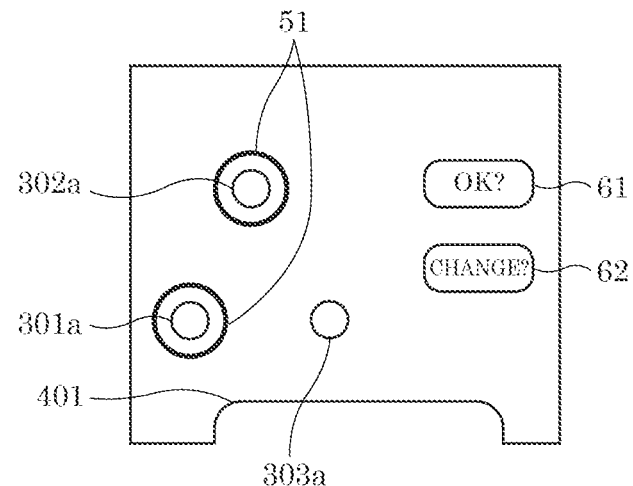
FIG. 7A illustrates an example of a camera image according to the second exemplary embodiment of the present invention.

In step S23, marker pair presenter 15 presents to the user the marker pair which matches the learned marker pair on the display device. FIG. 7A illustrates an example of the presentation at this time. As illustrated in FIG. 7A, three marker candidates 301a, 302a, and 303a are displayed in a camera image. In FIG. 7A, marker pair presenter 15 displays thick circles 51 surrounding marker candidates 301a and 302a to present the marker pair (first marker pair). In addition, as in FIG. 7A, indications 61 and 62 for prompting the user to make a selection are displayed being superimposed on the camera image. The user performs operation of selecting indication 61 to accept the presented marker pair. On the other hand, the user performs operation of selecting indication 62 to accept a marker pair other than the presented marker pair.

In step S24, marker pair presenter 15 determines whether acceptance of the presented marker pair has been received from the user. As described above, the user performs operation of selecting indication 61 to accept the presented marker pair. If the result of the determination shows that acceptance has been received from the user (step S24: YES), the flow ends. In this case, marker pair presenter 15 adopts the presented marker pair, and notifies parking path calculator 13 of the positions of two markers which form the marker pair. On the other hand, if the result of the determination shows that acceptance is not received from the user (step S24: NO), the flow proceeds to step S25.

Figure 7B:
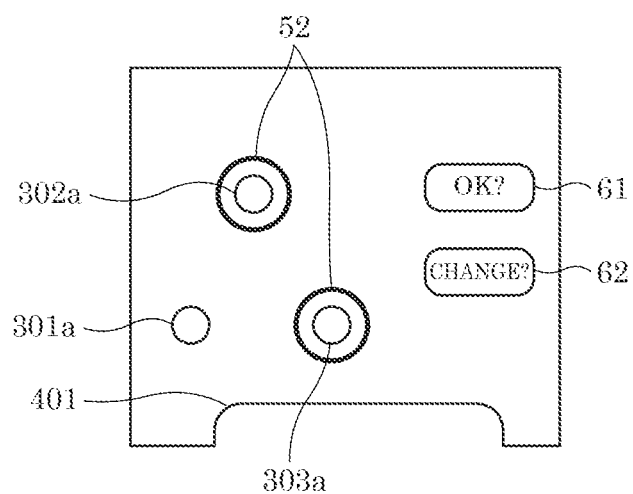
FIG. 7B illustrates an example of a camera image according to the second exemplary embodiment of the present invention.

In step S25, marker pair presenter 15 presents to the user another marker pair among the notified plural marker pairs. FIG. 7B illustrates an example of presentation at this time. As illustrated in FIG. 7B, three marker candidates 301a, 302a, and 303a are displayed in the camera image. In FIG. 7B, marker pair presenter 15 displays thick circles 52 surrounding marker candidates 302a and 303a to present a marker pair (second marker pair). In addition, in FIG. 7B, indications 61 and 62 are displayed being superimposed on the camera image, as with FIG. 7A. After that, the flow returns to step S24.

In step S26, marker pair presenter 15 selects a marker pair from among the notified plural marker pairs, and presents the selected marker pair to the user on the display device. An example of the presentation at this time is the same as that in FIG. 7A.

In step S27, marker pair presenter 15 determines whether acceptance of the presented marker pair has been received from the user. If the result of the determination shows that acceptance has been received from the user (step S27: YES), the flow proceeds to step S28. On the other hand, if the result of the determination shows that acceptance is not received from the user (step S27: NO), the flow proceeds to step S29.

In step S28, marker pair presenter 15 stores the presented marker pair into marker pair storage 16 as a learned marker pair. In this case, marker pair presenter 15 adopts the presented marker pair, and notifies parking path calculator 13 of the positions of two markers which form the marker pair. After that, the flow ends.

In step S29, marker pair presenter 15 presents to the user another marker pair among the notified plural marker pairs. An example of the presentation at this time is the same as that in FIG. 7B. After that, the flow returns to step S27.

As described above, the parking assistance system according to the present exemplary embodiment has a feature of presenting to a user an appropriate marker pair based on learned data if there are plural marker pairs whose validity has been verified, in addition to a feature of the parking assistance system according to the first exemplary embodiment. Furthermore, the parking assistance system according to the present exemplary embodiment has a feature of storing, if there is no learned data, a marker pair selected by the user as learned data, and using the data for the next presentation. Specifically, the parking assistance system according to the present exemplary embodiment presents a marker pair using learned data, and thus the user does not need to perform operation of selecting an appropriate marker pair from among plural marker pairs. In addition, if there is no learned data that matches the selected marker pair, the parking assistance system according to the present exemplary embodiment learns the selected marker pair, and uses the learned marker pair when presenting the next marker pair. Thus, the user does not need to perform operation of selecting an appropriate marker pair from among plural marker pairs next time. Accordingly, in addition to the advantageous effect achieved by the parking assistance system according to the first exemplary embodiment, the parking assistance system according to the present exemplary embodiment can improve user's convenience.

Although the above has described the first and second exemplary embodiments of the present invention, the above description is an example and various modifications are possible.

For example, although the first and second exemplary embodiments have described examples in which validity is verified based on a predetermined distance between markers, the present invention is not limited to this. For example, two markers have different colors, and validity verifier 11 stores the positions and colors of the two markers in association (the right marker is blue and the left marker is red, for example).

Accordingly, validity verifier 11 recognizes two marker candidates as predetermined markers if the two marker candidates detected from a camera image satisfy the above conditions stored.

For example, although the first and second exemplary embodiments have described examples in which color/IR detector 22 of camera 20 detects a marker candidate based on a color or IR component, the present invention is not limited to these. For example, a configuration may be adopted in which parking assistance device 100 or 101 detects a marker candidate.

In addition, for example, the operation of the parking assistance systems according to the first and second exemplary embodiments described above can also be achieved by software in cooperation with hardware.

INDUSTRIAL APPLICABILITY

The present invention is applicable to a parking assistance system and a parking assistance method for assisting parking a vehicle, based on image information displayed on a display device in the vehicle, for example.

REFERENCE MARKS IN THE DRAWINGS

10 marker position calculator
11 validity verifier
12 vehicle position calculator
13 parking-path calculator
14 steering angle indicator
15 marker pair presenter
16 marker pair storage
20 lens
21 image sensor
22 color/IR detector
100, 101 parking assistance device
200 camera
301, 302, 303 marker
400 vehicle

The invention claimed is:

1. A parking assistance system to assist parking a vehicle in a parking area, the parking assistance system comprising:
   a camera; and
   a parking assistance device comprising a processor configured to execute instructions to:
      detect, from a camera image captured with the camera, marker candidates that are areas in each of which an intensity of a color component or an infrared (IR) component exceeds a threshold;
      calculate positions of the marker candidates in the camera image;
      determine whether the marker candidates are valid as the markers, based on the positions of the marker candidates and a predetermined positional relationship of the markers indicating the parking area;
      calculate a path along which the vehicle is to move, based on positions of the marker candidates which is determined to be valid as the markers and a current position of a vehicle; and
      indicate a steering angle for the vehicle to move along the path.

2. The parking assistance system according to claim 1, wherein whether the marker candidates are valid as the markers is determined by:
   selecting a first marker candidate from the marker candidates;
   calculating an area in which a second marker candidate paired with the first marker candidate is likely to be present, based on a position of the first marker candidate and the predetermined positional relationship of the markers;
   determining a marker candidate present in the calculated area to be the second marker candidate; and
   determining the first marker candidate and the second marker candidate paired to be valid as the markers.

3. The parking assistance system according to claim 2, wherein the parking assistance device further comprises
   a marker combination storage which stores a learned marker combination that is a marker combination accepted by a user, and wherein:
   the processor is further configured to present a marker combination among the marker combinations to the user, if the marker candidates form marker combinations and the marker combinations are determined to be each valid as the markers, and
   wherein the marker combinations are compared with the learned marker combination, and a marker combination among the marker combinations which is shown to match the learned marker combination by a result of the comparison is presented to the user.

4. The parking assistance system according to claim 1, wherein the parking assistance device further comprises:
   a marker combination storage which stores a learned marker combination that is a marker combination accepted by a user, and
   the processor is further configured to:
      present, if the marker candidates form marker combinations and the marker combinations are determined to be each valid as the markers, a marker combination among the marker combinations to the user;
      compare the marker combinations with the learned marker combination; and
      present, to the user, a marker combination among the marker combinations which is shown to match the learned marker combination by a result of the comparison.

5. The parking assistance system according to claim 4, wherein the marker combination among the marker combinations is presented to the user if the result of the comparison shows that none of the marker combinations matches the learned marker combination.

6. The parking assistance system according to claim 5, wherein if the user accepts the presented marker combination, the presented marker combination is stored into the marker combination storage as the learned marker combination.

7. The parking assistance system according to claim 5, wherein if the user does not accept the presented marker combination, another marker combination among the marker combinations is presented to the user.

8. The parking assistance system according to claim 4, wherein if the user does not accept the presented marker combination, another marker combination among the marker combinations is presented to the user.

9. A parking assistance method to assist parking a vehicle in a parking area, the parking assistance method comprising:
detecting, from a camera image captured with a camera mounted to the vehicle, marker candidates that are areas in each of which an intensity of a color component or an infrared (IR) component exceeds a threshold;
calculating positions of the marker candidates in the camera image;
determining whether the marker candidates are valid as the markers, based on the positions of the marker candidates and a predetermined positional relationship of the markers indicating the parking area;
calculating a path along which the vehicle is to move, based on positions of the marker candidates which is determined to be valid as the markers and a current position of a vehicle; and
indicating a steering angle for the vehicle to move along the path.

10. The parking assistance method according to claim 9 further comprising:
presenting, if the marker candidates form marker combinations and the marker combinations are determined to be each valid as the markers, a marker combination among the marker combinations to a user;
comparing the marker combinations with a learned marker combination that is a marker combination accepted by the user and stored in advance; and
presenting, to the user, a marker combination among the marker combinations which is shown to match the learned marker combination by a result of the comparison.

11. A parking assistance system for capturing an image that includes markers indicating a parking area, calculating a path based on positions of the markers and a current position of a vehicle, and indicating a steering angle for the vehicle to move along the path, to assist parking the vehicle in the parking area, the parking assistance system comprising:
a camera;
a parking assistance device comprising a processor; and
a marker combination storage which stores a learned marker combination that is a marker combination accepted by a user,
wherein the processor is configured to:
detect, from a camera image captured with the camera, marker candidates that are areas in each of which an intensity of a color component or an infrared (IR) component exceeds a threshold;
calculate positions of the marker candidates in the camera image;
determine whether the marker candidates are valid as the markers, based on the positions of the marker candidates and a predetermined positional relationship of the markers;
present, if the marker candidates form marker combinations and the marker combinations are determined to be each valid as the markers, a marker combination among the marker combinations to the user;
compare the marker combinations with the learned marker combination; and
present, to the user, a marker combination among the marker combinations which is shown to match the learned marker combination by a result of the comparison.

12. The parking assistance system according to claim 11, wherein the marker combination among the marker combinations is presented to the user if the result of the comparison shows that none of the marker combinations matches the learned marker combination.

13. The parking assistance system according to claim 12, wherein if the user accepts the presented marker combination, the presented marker combination is stored into the marker combination storage as the learned marker combination.

14. The parking assistance system according to claim 12, wherein if the user does not accept the presented marker combination, another marker combination among the marker combinations is presented to the user.

15. The parking assistance system according to claim 11, wherein if the user does not accept the presented marker combination, another marker combination among the marker combinations is presented to the user.

16. The parking assistance system according to claim 11, wherein whether the marker candidates are valid as the markers is determined by:
selecting a first marker candidate from the marker candidates;
calculating an area in which a second marker candidate paired with the first marker candidate is likely to be present, based on a position of the first marker candidate and the predetermined positional relationship of the markers;
determining a marker candidate present in the calculated area to be the second marker candidate; and
determining the first marker candidate and the second marker candidate paired to be valid as the markers.

* * * * *

UNITED STATES PATENT AND TRADEMARK OFFICE
CERTIFICATE OF CORRECTION

PATENT NO. : 9,727,796 B2
APPLICATION NO. : 14/652300
DATED : August 8, 2017
INVENTOR(S) : Akihisa Kawasaki et al.

Page 1 of 1

It is certified that error appears in the above-identified patent and that said Letters Patent is hereby corrected as shown below:

On the Title Page

At item (71), "Panasonic Corporation" should read --Panasonic Intellectual Property Management Co., Ltd.--

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*